(12) United States Patent
Chiu et al.

(10) Patent No.: US 8,390,991 B2
(45) Date of Patent: *Mar. 5, 2013

(54) STACKED SOLID-STATE ELECTROLYTIC CAPACITOR WITH MULTI-DIRECTIONAL PRODUCT LEAD FRAME STRUCTURE

(75) Inventors: Chi-Hao Chiu, Hsinchu (TW); Yui-Shin Fran, Hsinchu (TW); Ching-Feng Lin, Hsinchu County (TW); Chun-Chia Huang, Tainan County (TW); Chun-Hung Lin, Yunlin County (TW); Wen-Yen Huang, Taoyuan County (TW)

(73) Assignee: Apaq Technology Co., Ltd., Miaoli County (TW)

( * ) Notice: Subject to any disclaimer, the term of this patent is extended or adjusted under 35 U.S.C. 154(b) by 274 days.

This patent is subject to a terminal disclaimer.

(21) Appl. No.: 12/833,421

(22) Filed: Jul. 9, 2010

(65) Prior Publication Data
US 2011/0216475 A1 Sep. 8, 2011

(30) Foreign Application Priority Data

Mar. 5, 2010 (TW) ............................... 99106487 A

(51) Int. Cl.
*H01G 9/04* (2006.01)
*H01G 9/15* (2006.01)
*H01G 4/228* (2006.01)

(52) U.S. Cl. ................... 361/541; 361/434; 361/523

(58) Field of Classification Search .......... 361/434, 361/523, 541
See application file for complete search history.

(56) References Cited

U.S. PATENT DOCUMENTS

| | | | | |
|---|---|---|---|---|
| 3,293,507 A | * | 12/1966 | Smith | 361/518 |
| 3,466,508 A | * | 9/1969 | Booe | 361/536 |
| 3,828,227 A | * | 8/1974 | Millard et al. | 361/540 |
| 3,970,903 A | * | 7/1976 | Shirn | 361/533 |
| 4,090,288 A | * | 5/1978 | Thompson et al. | 29/25.03 |
| 4,203,194 A | * | 5/1980 | McGrath | 29/25.03 |
| 4,571,664 A | * | 2/1986 | Hyland | 361/540 |
| 4,660,127 A | * | 4/1987 | Gunter | 361/540 |
| 5,410,445 A | * | 4/1995 | Kanetake | 361/539 |
| 6,238,444 B1 | * | 5/2001 | Cadwallader | 29/25.03 |

(Continued)

*Primary Examiner* — Anatoly Vortman
(74) *Attorney, Agent, or Firm* — C. G. Mersereau; Nikolai & Mersereau, P.A.

(57) ABSTRACT

A stacked solid state solid electrolytic capacitor includes a plurality of capacitor units, a substrate unit and a package unit. The substrate unit includes a positive guiding substrate and a negative guiding substrate. The positive guiding substrate has a positive exposed end integrally extended therefrom along a first predetermined direction. The negative guiding substrate has a first negative exposed end integrally extended therefrom along a second predetermined direction, a second negative exposed end integrally extended therefrom along a third predetermined direction, and a third negative exposed end integrally extended therefrom along a fourth predetermined direction. The first, the second, the third and the fourth predetermined directions are different. The capacitor units are stacked on top of one another and disposed on the negative guiding substrate. The package unit encloses the capacitor units, one part of the positive and one part of the negative guiding substrate.

14 Claims, 11 Drawing Sheets

U.S. PATENT DOCUMENTS

| | | | |
|---|---|---|---|
| 6,816,358 B2* | 11/2004 | Kida et al. | 361/540 |
| 6,954,351 B2* | 10/2005 | Konuma et al. | 361/523 |
| 6,970,345 B2* | 11/2005 | Oh et al. | 361/540 |
| 7,417,844 B2* | 8/2008 | Ishizuka et al. | 361/301.4 |
| 7,443,653 B2* | 10/2008 | Kim et al. | 361/523 |
| 7,570,480 B2* | 8/2009 | Kim et al. | 361/540 |
| 7,575,148 B2* | 8/2009 | Kubouchi et al. | 228/112.1 |
| 8,164,883 B2* | 4/2012 | Chiu et al. | 361/523 |
| 2002/0015277 A1* | 2/2002 | Nitoh et al. | 361/523 |
| 2003/0218858 A1* | 11/2003 | Kim et al. | 361/523 |
| 2004/0066607 A1* | 4/2004 | Edson et al. | 361/528 |
| 2005/0088805 A1* | 4/2005 | Edson et al. | 361/529 |
| 2006/0260109 A1* | 11/2006 | Vaisman et al. | 29/25.41 |
| 2006/0262489 A1* | 11/2006 | Vaisman et al. | 361/540 |
| 2007/0279841 A1* | 12/2007 | Kim et al. | 361/540 |
| 2008/0019081 A1* | 1/2008 | Kim et al. | 361/535 |
| 2008/0062617 A1* | 3/2008 | Edson et al. | 361/529 |
| 2008/0080124 A1* | 4/2008 | Kim et al. | 361/529 |
| 2009/0154065 A1* | 6/2009 | Choi et al. | 361/523 |
| 2009/0154066 A1* | 6/2009 | Choi et al. | 361/523 |
| 2009/0154068 A1* | 6/2009 | Choi et al. | 361/533 |
| 2011/0002087 A1* | 1/2011 | Chiu et al. | 361/523 |
| 2011/0007451 A1* | 1/2011 | Fran et al. | 361/540 |
| 2011/0007452 A1* | 1/2011 | Lin et al. | 361/541 |
| 2012/0092810 A1* | 4/2012 | Chiu et al. | 361/535 |
| 2012/0099247 A1* | 4/2012 | Lin et al. | 361/536 |

* cited by examiner

US 8,390,991 B2

STACKED SOLID-STATE ELECTROLYTIC CAPACITOR WITH MULTI-DIRECTIONAL PRODUCT LEAD FRAME STRUCTURE

BACKGROUND OF THE INVENTION

1. Field of the Invention

The present invention relates to a stacked solid-state electrolytic capacitor, and more particularly, to a stacked solid-state electrolytic capacitor with multi-directional product lead frame structure.

2. Description of Related Art

Various applications of capacitors include home appliances, computer motherboards and peripherals, power supplies, communication products and automobiles. The capacitors such as solid electrolytic capacitors are mainly used to provide filtering, bypassing, rectifying, coupling, blocking or transforming function.

Because the solid electrolytic capacitor has the advantages of small size, large electrical capacity and good frequency characteristic, it can be used as a decoupling element in the power circuit of a central processing unit (CPU). In general, a plurality of capacitor elements is stacked together to form a stacked solid electrolytic capacitor with a high electrical capacity. In addition, the stacked solid electrolytic capacitor of the prior art includes a plurality of capacitor elements and a lead frame. Each capacitor element includes an anode part, a cathode part and an insulating part. The insulating part is insulated from the anode part and the cathode part. More specifically, the cathode parts of the capacitor elements are stacked on top of one another. Furthermore, conductive layers are disposed between adjacent capacitor elements so that the capacitor elements are electrically connected to one another.

SUMMARY OF THE INVENTION

One particular aspect of the present invention is to provide a stacked solid-state electrolytic capacitor with multi-directional product lead frame structure. The stacked solid-state electrolytic capacitor has the following advantages:
 1. Large area, large capacity, low profile and low cost; and
 2. The soldering difficulty is decreased, and the ESR (Equivalent Series Resistance) and the ESL (Equivalent Series Inductance) are decreased.

In order to achieve the above-mentioned aspects, the present invention provides a stacked solid-state electrolytic capacitor with multi-directional product lead frame structure, including: a plurality of capacitor units, a substrate unit and a package unit. The capacitor units are stacked onto each other. Each capacitor unit has a positive electrode and a negative electrode, the positive electrode of each capacitor unit has a positive pin extended outwards, the positive pins of the capacitor units are electrically stacked onto each other, and the negative electrodes of the capacitor units are electrically stacked onto each other. The substrate unit has at least one positive guiding substrate electrically connected to the positive pins of the capacitor units and a plurality of negative guiding substrates electrically connected to the negative electrodes of the capacitor units. The package unit covers the capacitor units and one part of the substrate unit in order to expose an end of the at least one positive guiding substrate and an end of each negative guiding substrate.

In order to achieve the above-mentioned aspects, the present invention provides a stacked solid-state electrolytic capacitor with multi-directional product lead frame structure, including: a plurality of capacitor units, a substrate unit and a package unit. The capacitor units are stacked onto each other. Each capacitor unit has a positive electrode and a negative electrode, the positive electrode of each capacitor unit has a positive pin extended outwards, the positive pins are divided into a plurality of positive pin units, the positive pins of each positive pin unit are electrically stacked onto each other, and the negative electrodes of the capacitor units are electrically stacked onto each other. The substrate unit has a plurality of positive guiding substrates respectively electrically connected to the positive pin units of the capacitor units and at least one negative guiding substrate electrically connected to the negative electrodes of the capacitor units. The package unit covers the capacitor units and one part of the substrate unit in order to expose an end of each positive guiding substrate and an end of the at least one negative guiding substrate.

Therefore, the present invention uses one or more positive pins (the positive pins are respectively extended outwards from the positive electrodes along the same direction or different directions) and one or more negative pins to respectively electrically connect to one or more positive guiding substrates and one or more negative guiding substrates, and thus the soldering difficulty is decreased and the ESR (Equivalent Series Resistance) and the ESL (Equivalent Series Inductance) are also decreased.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are provided solely for reference and illustration, without any intention that they be used for limiting the present invention.

DETAILED DESCRIPTION OF THE PREFERRED EMBODIMENTS

Referring to FIGS. 1A to 1E, the first embodiment of the present invention provides a stacked solid-state electrolytic capacitor with multi-directional product lead frame structure, including: a plurality of capacitor units 1, a substrate unit 2 and a package unit 3.

Figure 1A:
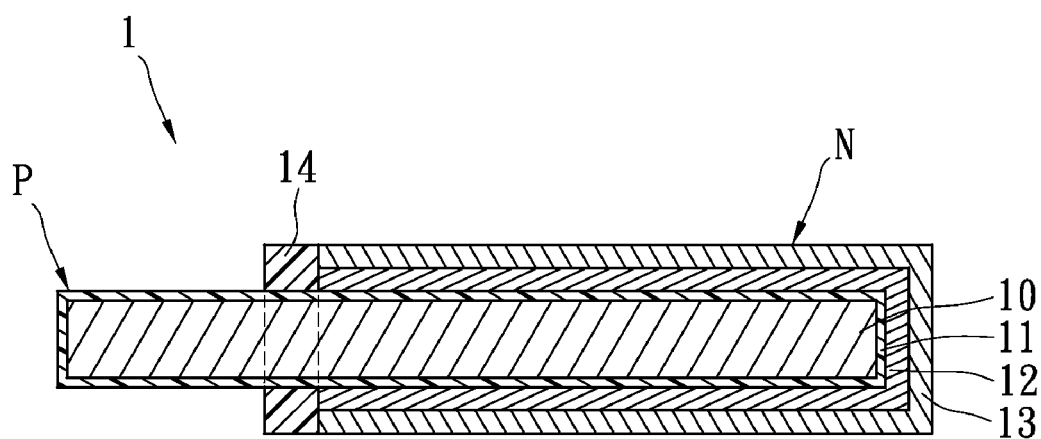
FIG. 1A is a lateral, cross-sectional, schematic view of the stacked solid-state electrolytic capacitor according to the first embodiment of the present invention.
Figure 1B:
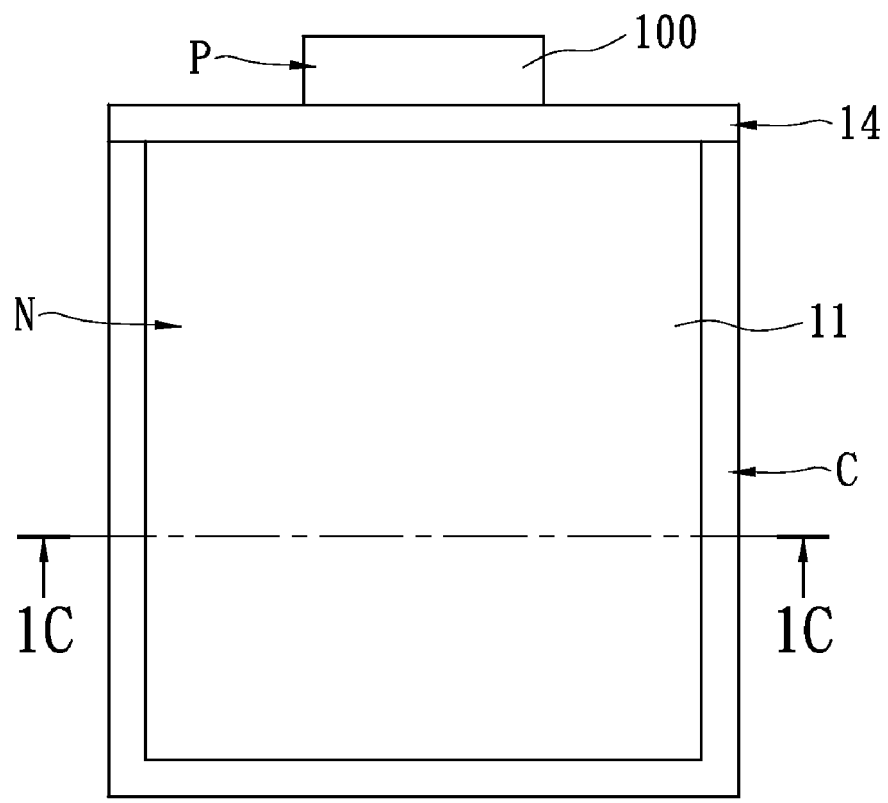
FIG. 1B is a top, schematic view of the resin body covering an edge of the oxide insulation layer according to the first embodiment of the present invention.
Figure 1C:
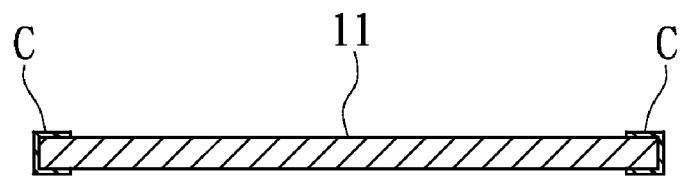
FIG. 1C is a cross-sectional, schematic view along line 1C-1C of FIG. 1B.

Referring to FIGS. 1A to 1C, each capacitor unit 1 has a positive electrode P and a negative electrode N, and each capacitor unit 1 has a valve metal foil 10, an oxide insulation layer 11 covering the valve metal foil 10, a conductive polymer layer 12 covering one side of the oxide insulation layer 11 and a carbon glue layer 13 covering the conductive polymer layer 12. In addition, each capacitor unit 1 has an insulating layer 14 disposed around one part of an external surface of each oxide insulation layer 11 in order to limit the lengths of each conductive polymer layer 12 and each carbon glue layer 13. In other words, each insulating layer 14 is disposed around one part of a top, a bottom, a left and a right surfaces of each oxide insulation layer 11. Each insulating layer 14 is an insulating line between the positive electrode P and the negative electrode N of the each capacitor unit 1. Moreover, each capacitor unit 1 has a resin body C selectively covering an external edge of each oxide insulation layer 11 as shown in FIGS. 1B and 1C.

Figure 1D:
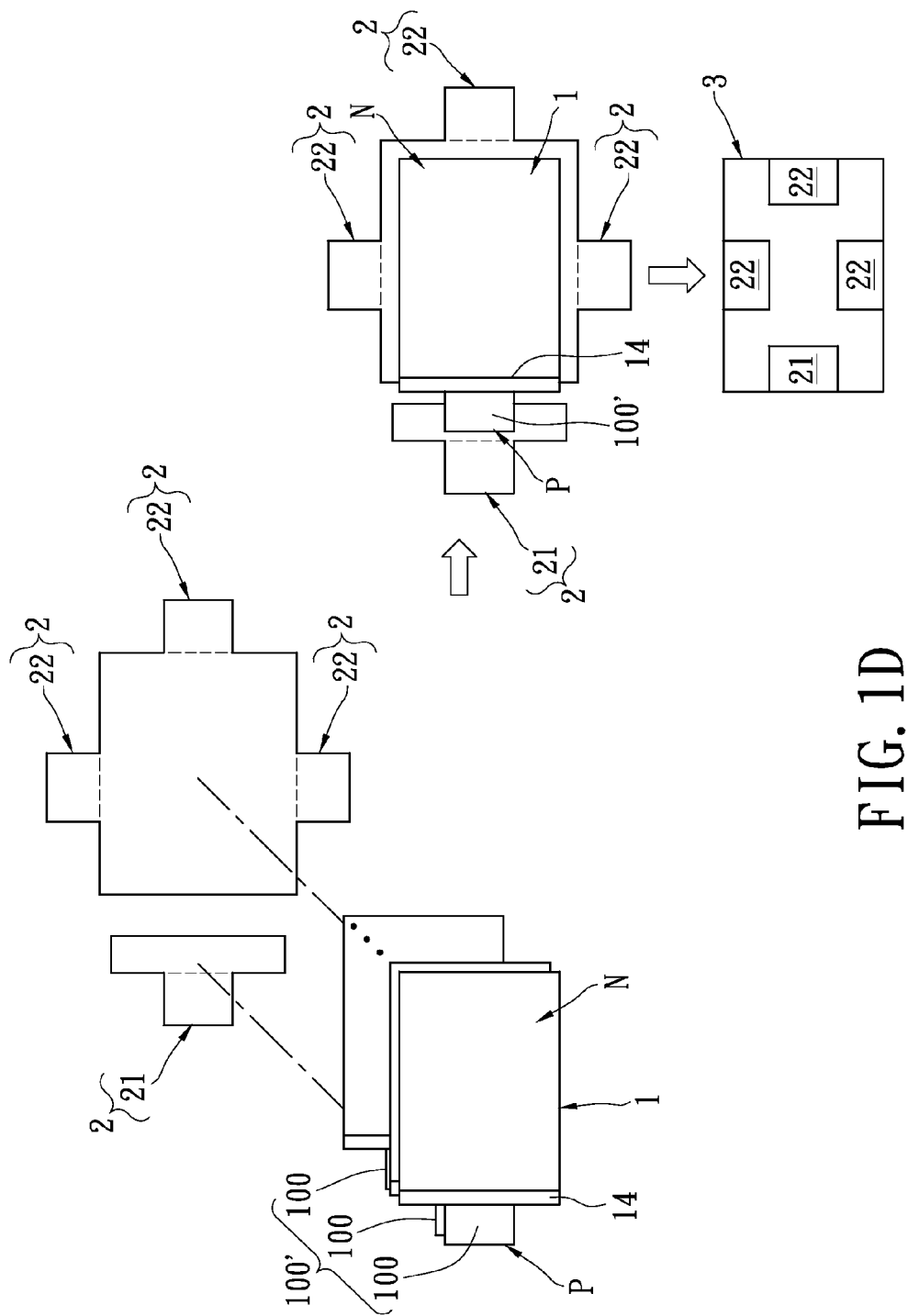
FIG. 1D is a schematic view of the method of stacking the positive electrodes and the negative electrode according to the first embodiment of the present invention.

Furthermore, FIG. 1D shows three steps, the first step shows a perspective exploded view of the semi-finished product, the second step shows a top assembled diagram of the semi-finished product, and the third step shows a bottom view of the finished product. The capacitor units 1 are stacked onto each other. The positive electrode P of each capacitor unit 1 has a positive pin 100 extended outwards, the positive pins 100 of the capacitor units 1 are electrically stacked onto each other to form a positive pin unit 100', and the negative electrodes N of the capacitor units 1 are electrically stacked onto each other. In addition, the substrate unit 2 has at least one positive guiding substrate 21 electrically connected to the positive pins 100 (the positive pin unit 100') of the capacitor units 1 and a plurality of negative guiding substrates 22 electrically connected to the negative electrodes N of the capacitor units 1. For example, the negative guiding substrates 22 can be combined together to form a one-piece conductive substrate as shown in the first embodiment or can be separated from each other by a predetermined distance.

In addition, the at least one positive guiding substrate 21 and the negative guiding substrates 22 can be bent along the dotted lines as shown in FIG. 1D, and thereby the end of the at least one positive guiding substrate 21 and the end of each negative guiding substrate 22 can be disposed on a bottom portion of the package unit 3 by bending (as shown in the third step of FIG. 1D). Hence, the first embodiment of the present invention can provide at least one positive product lead frame (such as at least one positive guiding substrate 21) and three negative product lead frames (such as three negative guiding substrates 22).

Figure 1E:
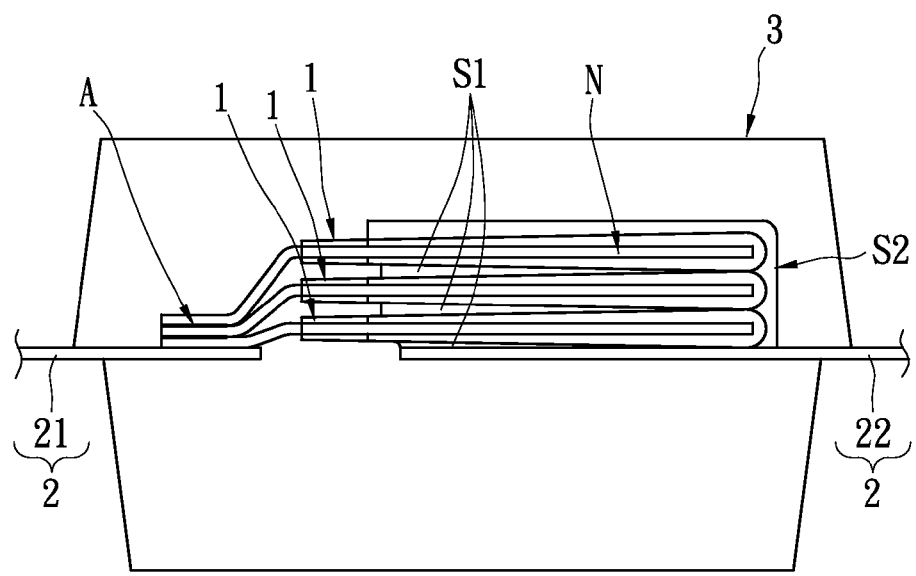
FIG. 1E is a lateral, exploded, schematic view of the first type of the stacked solid-state electrolytic capacitor according to the first embodiment of the present invention.

Furthermore, referring to FIG. 1E, the package unit 3 covers the capacitor units 1 and one part of the substrate unit 2 in order to expose an end of the at least one positive guiding substrate 21 and an end of each negative guiding substrate 22.

In addition, there are many conductive layers S1 and each conductive layer S1 is coated between every two capacitor units 1. For example, the negative electrodes N of the capacitor units 1 are electrically stacked onto each other by silver glue or silver paste. In other words, the carbon glue layers 13 of the capacitor units 1 are electrically stacked onto each other by the conductive layers S1. In addition, there is a conductive layer S2 such as silver glue or silver pates formed on the topmost capacitor unit 1 and on the lateral side of each capacitor unit 1.

Figure 1F:
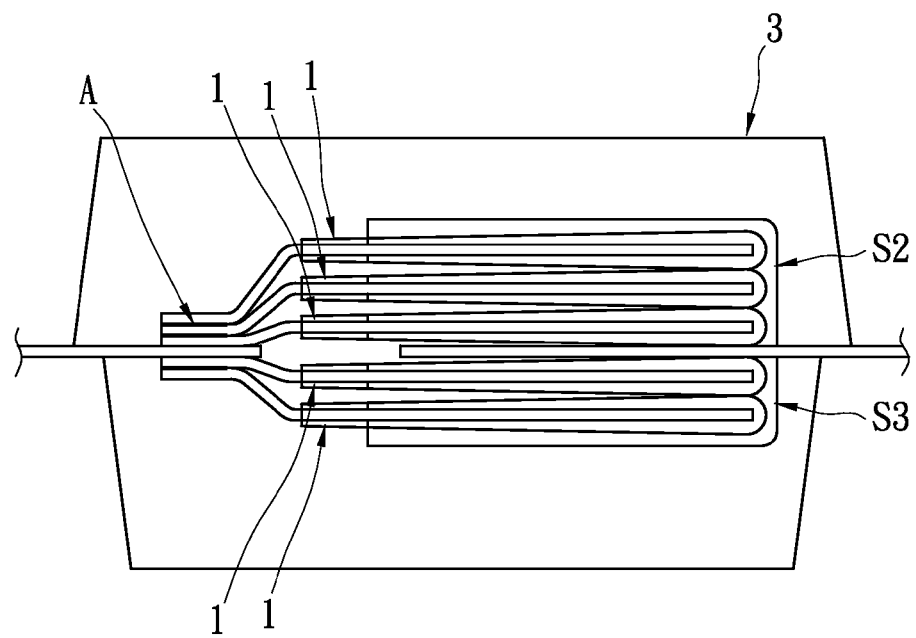
FIG. 1F is a lateral, exploded, schematic view of the second type of the stacked solid-state electrolytic capacitor according to the first embodiment of the present invention.

Referring to FIG. 1F, the present invention discloses a two-side stacked capacitor, and the two-side stacked capacitor can lack the usage of the conductive layer S1 as shown in FIG. 1E. In other words, the carbon glue layers 13 of the capacitor units 1 can be directly electrically stacked onto each other. In addition, there is a conductive layer S2 such as silver glue or silver pates formed on the topmost capacitor unit 1 and on the lateral side of each capacitor unit 1, and there is a conductive layer S3 formed on the bottommost capacitor unit 1 and on the lateral side of each capacitor unit 1. In other words, the present invention can be a single-side stacked capacitor that is composed of many capacitor units 1 electrically stacked onto each other by mating the conductive layers S1, S2 as shown in FIG. 1E or a two-side stacked capacitor that is composed of many capacitor units 1 electrically stacked onto each other by mating the conductive layers S2, S3 as shown in FIG. 1F. However, no matter single-side or two-side stacked capacitor can use carbon glue or silver glue to stack the capacitor units 1 in order to achieve a stacked capacitor structure of the present invention.

Besides, the positive pins 100 of the capacitor units 1 as shown in FIG. 1B are electrically soldered by a plurality of soldering points A as shown in FIGS. 1E and 1F.

Figure 2:
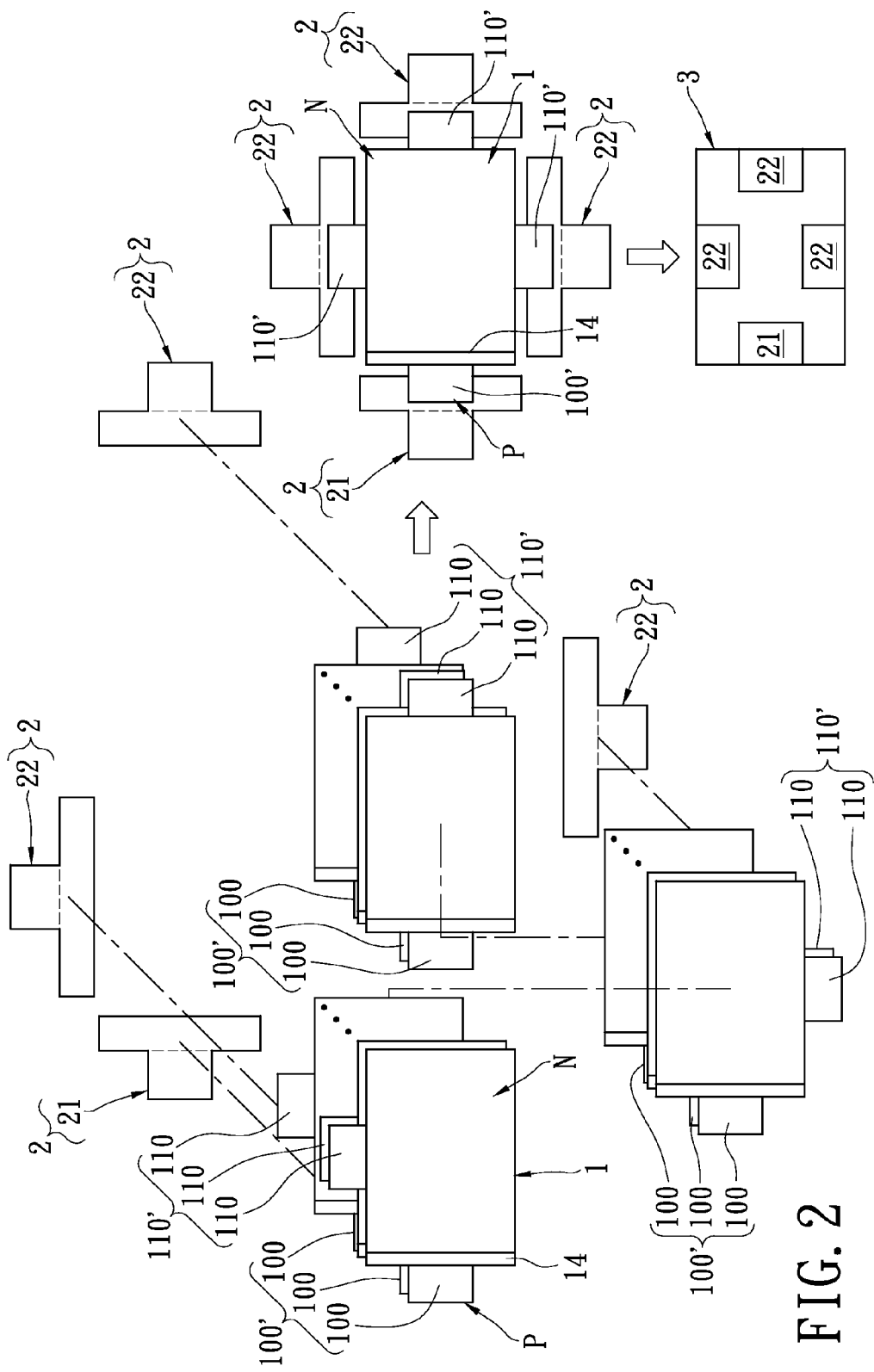
FIG. 2 is a schematic view of the method of stacking the positive electrodes and the negative electrode according to the second embodiment of the present invention.

FIG. 2 shows three steps, the first step shows a perspective exploded view of the semi-finished product, the second step shows a top assembled diagram of the semi-finished product, and the third step shows a bottom view of the finished product.

The second embodiment of the present invention provides a stacked solid-state electrolytic capacitor with multi-directional product lead frame structure, including: a plurality of capacitor units 1, a substrate unit 2 and a package unit 3. The capacitor units 1 are stacked onto each other. The positive electrode P of each capacitor unit 1 has a positive pin 100 extended outwards, the positive pins 100 of the capacitor units 1 are electrically stacked onto each other to form a positive pin unit 100', and the negative electrodes N of the capacitor units 1 are electrically stacked onto each other. In addition, the substrate unit 2 has at least one positive guiding substrate 21 electrically connected to the positive pins 100 (the positive pin unit 100') of the capacitor units 1 and a plurality of negative guiding substrates 22 electrically connected to the negative electrodes N of the capacitor units 1. For example, the negative guiding substrates 22 can be combined together to form a one-piece conductive substrate or can be separated from each other by a predetermined distance as shown in the second embodiment. In addition, the at least one positive guiding substrate 21 and the negative guiding substrates 22 can be bent along the dotted lines as shown in FIG. 2, and thereby the end of the at least one positive guiding substrate 21 and the end of each negative guiding substrate 22 can be disposed on a bottom portion of the package unit 3 by bending (as shown in the third step of FIG. 2).

Hence, the difference between the second embodiment and the first embodiment is that: in the second embodiment, the negative electrode N of each capacitor unit 1 has a negative pin 110 extended outwards, the negative pins 110 are divided into a plurality of negative pin units 110', the negative pins 110 of each negative pin unit 110' are electrically stacked onto each other, and the negative pin units 110' are separated from each other and respectively electrically connected to the negative guiding substrates 22. Therefore, the second embodiment of the present invention can provide at least one positive product lead frame (such as at least one positive guiding substrate 21) and three negative product lead frames (such as three negative guiding substrates 22).

Figure 3:
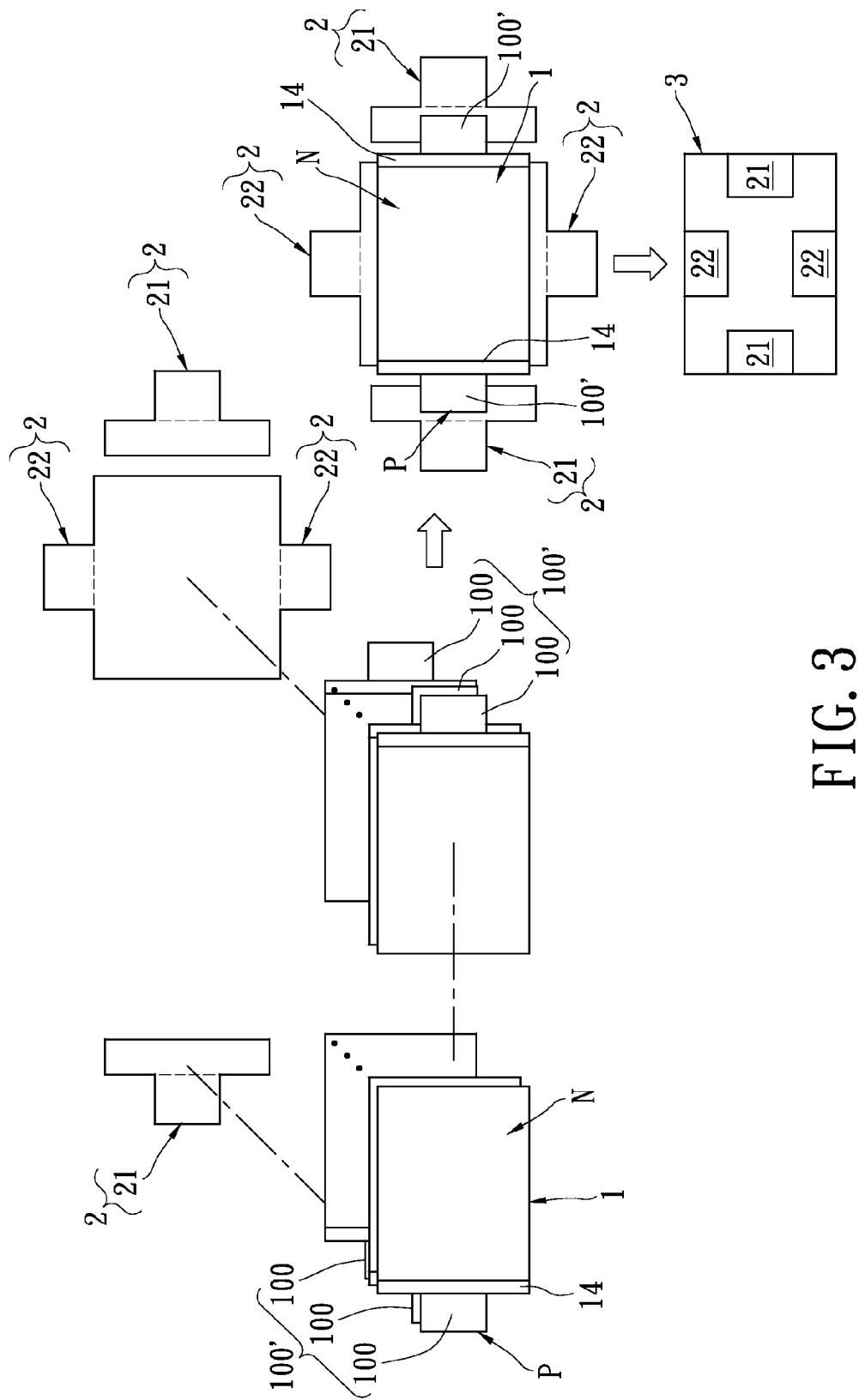
FIG. 3 is a schematic view of the method of stacking the positive electrodes and the negative electrode according to the third embodiment of the present invention.

FIG. 3 shows three steps, the first step shows a perspective exploded view of the semi-finished product, the second step shows a top assembled diagram of the semi-finished product, and the third step shows a bottom view of the finished product.

The third embodiment of the present invention provides a stacked solid-state electrolytic capacitor with multi-directional product lead frame structure, including: a plurality of capacitor units 1, a substrate unit 2 and a package unit 3. The capacitor units 1 are stacked onto each other. The positive electrode P of each capacitor unit 1 has a positive pin 100 extended outwards, the positive pins 100 are divided into a plurality of positive pin units 100', the positive pins 100 of each positive pin unit 100' are electrically stacked onto each other, and the negative electrodes N of the capacitor units 1 are electrically stacked onto each other. In addition, the substrate unit 2 has a plurality of positive guiding substrates 21 respectively electrically connected to the positive pin units 100' of the capacitor units 1 and a plurality of negative guiding substrates 22 electrically connected to the negative electrodes N of the capacitor units 1. For example, the negative guiding substrates 22 can be combined together to form a one-piece conductive substrate or can be separated from each other by a predetermined distance. In addition, the positive guiding substrates 21 and the negative guiding substrates 22 can be bent along the dotted lines as shown in FIG. 3, and thereby the end of each positive guiding substrate 21 and the end of each negative guiding substrate 22 can be disposed on a bottom portion of the package unit 3 by bending (as shown in the third step of FIG. 3).

Hence, the difference between the third embodiment and the first embodiment is that: in the third embodiment, the substrate unit 2 has a plurality of positive guiding substrates 21 respectively electrically connected to the positive pin units 100' of the capacitor units 1 and a plurality of negative guiding substrates 22 electrically connected to the negative electrodes N of the capacitor units 1. Therefore, the third embodiment of the present invention can provide two positive product lead frames (such as two positive guiding substrates 21) and two negative product lead frames (such as two negative guiding substrates 22).

Figure 4:
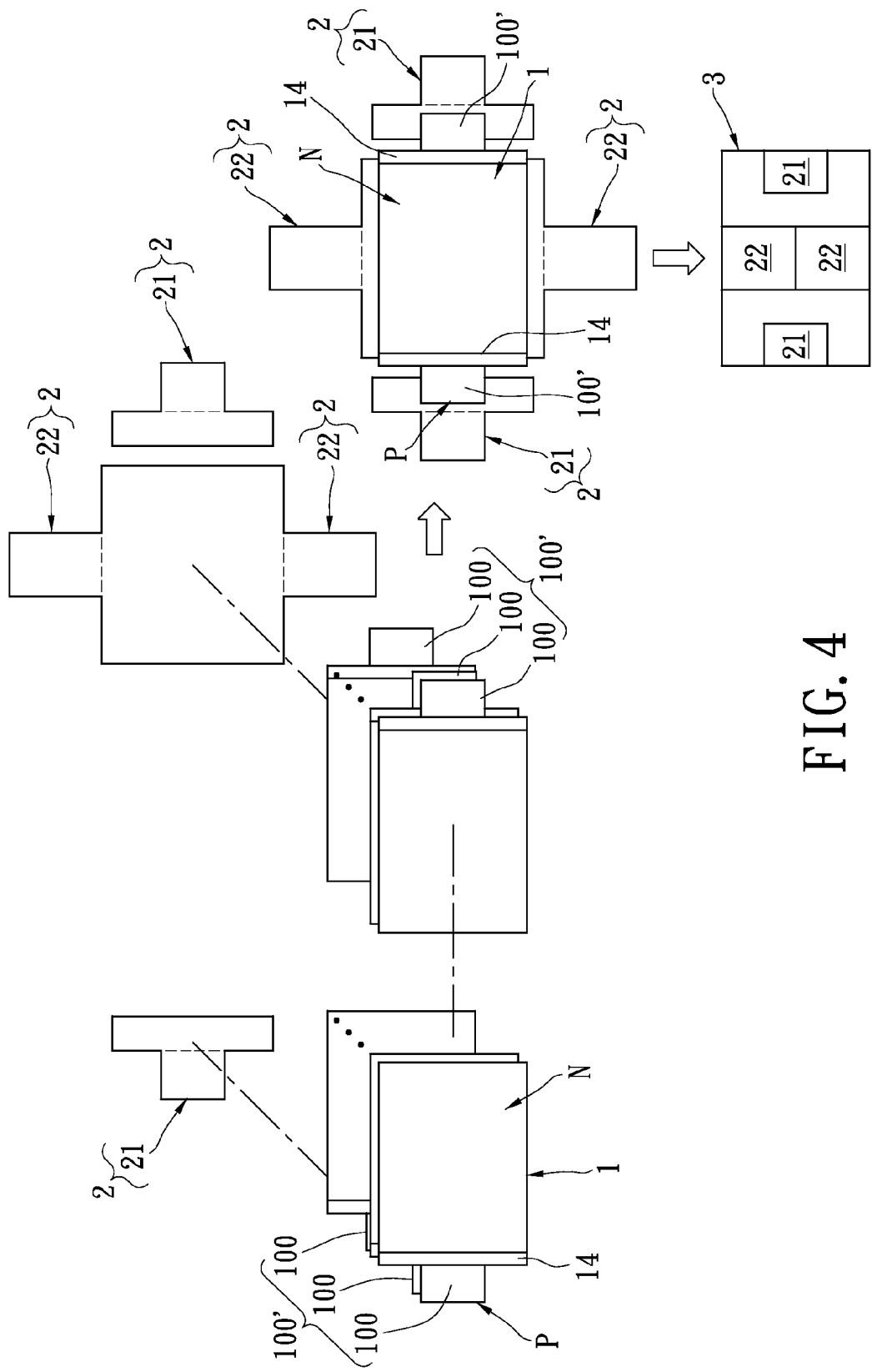
FIG. 4 is a schematic view of the method of stacking the positive electrodes and the negative electrode according to the fourth embodiment of the present invention.

FIG. 4 shows three steps, the first step shows a perspective exploded view of the semi-finished product, the second step shows a top assembled diagram of the semi-finished product, and the third step shows a bottom view of the finished product.

The fourth embodiment of the present invention provides a stacked solid-state electrolytic capacitor with multi-directional product lead frame structure, including: a plurality of capacitor units 1, a substrate unit 2 and a package unit 3. The capacitor units 1 are stacked onto each other. The positive electrode P of each capacitor unit 1 has a positive pin 100 extended outwards, the positive pins 100 are divided into a plurality of positive pin units 100', the positive pins 100 of each positive pin unit 100' are electrically stacked onto each other, and the negative electrodes N of the capacitor units 1 are electrically stacked onto each other. In addition, the substrate unit 2 has a plurality of positive guiding substrates 21 respectively electrically connected to the positive pin units 100' of the capacitor units 1 and a plurality of negative guiding substrates 22 electrically connected to the negative electrodes N of the capacitor units 1. For example, the negative guiding substrates 22 can be combined together to form a one-piece conductive substrate or can be separated from each other by a predetermined distance. In addition, the positive guiding substrates 21 and the negative guiding substrates 22 can be bent along the dotted lines as shown in FIG. 4, and thereby the end of each positive guiding substrate 21 and the end of each negative guiding substrate 22 can be disposed on a bottom portion of the package unit 3 by bending (as shown in the third step of FIG. 4). The ends of the negative guiding substrates 22 are combined together to form a one-piece product lead frame structure.

Hence, the difference between the fourth embodiment and the third embodiment is that: in the fourth embodiment, the ends of the negative guiding substrates 22 that have been electrically connected to the negative electrodes N of the capacitor units 1 are combined together. Therefore, the fourth embodiment of the present invention can provide two positive product lead frames (such as two positive guiding substrates 21) and at least one negative product lead frame (such as two negative guiding substrates 22 combined together).

Figure 5:
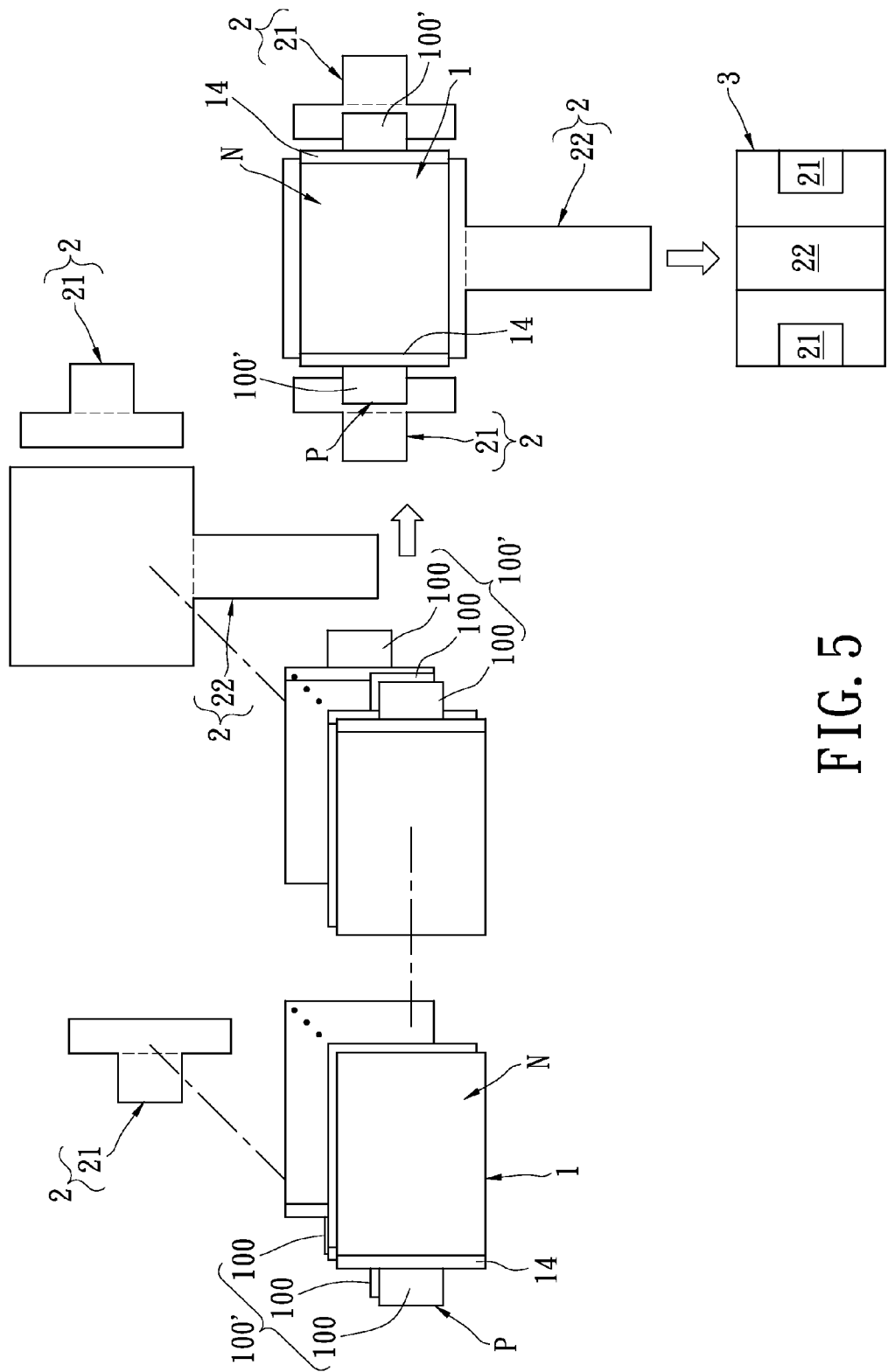
FIG. 5 is a schematic view of the method of stacking the positive electrodes and the negative electrode according to the fifth embodiment of the present invention.

FIG. 5 shows three steps, the first step shows a perspective exploded view of the semi-finished product, the second step shows a top assembled diagram of the semi-finished product, and the third step shows a bottom view of the finished product.

The fifth embodiment of the present invention provides a stacked solid-state electrolytic capacitor with multi-directional product lead frame structure, including: a plurality of capacitor units 1, a substrate unit 2 and a package unit 3. The capacitor units 1 are stacked onto each other. The positive electrode P of each capacitor unit 1 has a positive pin 100 extended outwards, the positive pins 100 are divided into a plurality of positive pin units 100', the positive pins 100 of each positive pin unit 100' are electrically stacked onto each other, and the negative electrodes N of the capacitor units 1 are electrically stacked onto each other. In addition, the substrate unit 2 has a plurality of positive guiding substrates 21 respectively electrically connected to the positive pin units 100' of the capacitor units 1 and at least one negative guiding substrate 22 electrically connected to the negative electrodes N of the capacitor units 1. In addition, the positive guiding substrates 21 and the at least one negative guiding substrate 22 can be bent along the dotted lines as shown in FIG. 5, and thereby the end of each positive guiding substrate 21 and the end of the at least one negative guiding substrate 22 can be disposed on a bottom portion of the package unit 3 by bending (as shown in the third step of FIG. 5). The ends of the negative guiding substrates 22 are combined together to form a one-piece product lead frame structure.

Hence, the difference between the fifth embodiment and the third and the fourth embodiment is that: in the fifth embodiment, the substrate unit 2 has at least one negative guiding substrate 22 electrically connected to the negative electrodes N of the capacitor units 1. In other words, two opposite ends of the negative guiding substrate 22 are connected to each other. Therefore, the fifth embodiment of the present invention can provide two positive product lead frames (such as two positive guiding substrates 21) and at least one negative product lead frame (such as at least one negative guiding substrate 22), and two opposite ends of the negative product lead frame are connected to each other.

Figure 6:
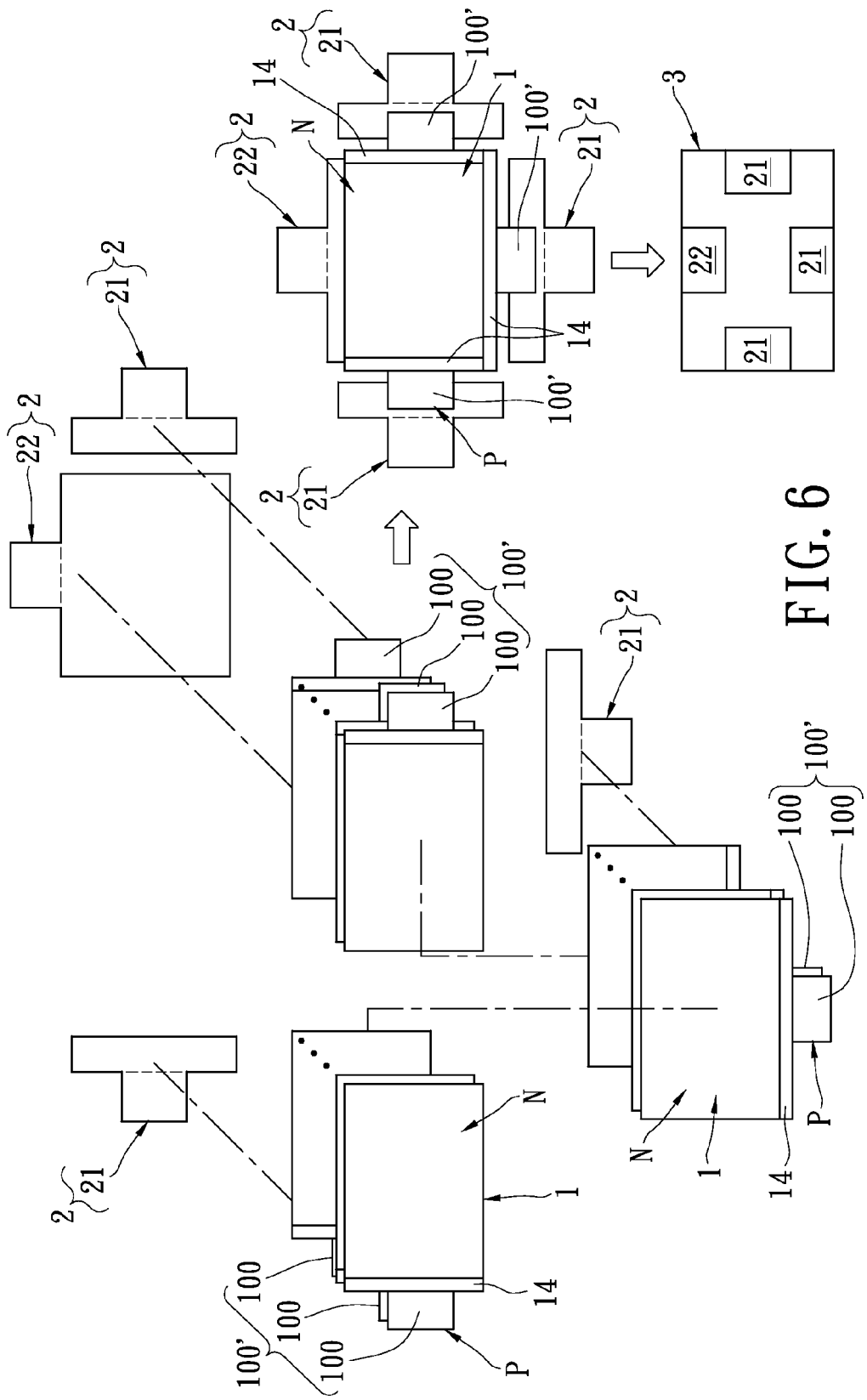
FIG. 6 is a schematic view of the method of stacking the positive electrodes and the negative electrode according to the sixth embodiment of the present invention.

FIG. 6 shows three steps, the first step shows a perspective exploded view of the semi-finished product, the second step shows a top assembled diagram of the semi-finished product, and the third step shows a bottom view of the finished product.

The sixth embodiment of the present invention provides a stacked solid-state electrolytic capacitor with multi-directional product lead frame structure, including: a plurality of capacitor units 1, a substrate unit 2 and a package unit 3. The capacitor units 1 are stacked onto each other. The positive electrode P of each capacitor unit 1 has a positive pin 100 extended outwards, the positive pins 100 are divided into a plurality of positive pin units 100', the positive pins 100 of each positive pin unit 100' are electrically stacked onto each other, and the negative electrodes N of the capacitor units 1 are electrically stacked onto each other. In addition, the substrate unit 2 has a plurality of positive guiding substrates 21 respectively electrically connected to the positive pin units 100' of the capacitor units 1 and at least one negative guiding substrate 22 electrically connected to the negative electrodes N of the capacitor units 1. In addition, the positive guiding substrates 21 and the at least one negative guiding substrate 22 can be bent along the dotted lines as shown in FIG. 6, and thereby the end of each positive guiding substrate 21 and the end of the at least one negative guiding substrate 22 can be disposed on a bottom portion of the package unit 3 by bending (as shown in the third step of FIG. 6).

Hence, the difference between the sixth embodiment and the third embodiment is that: in the sixth embodiment, the substrate unit 2 has a plurality of positive guiding substrates 21 respectively electrically connected to the positive pin units 100' of the capacitor units 1 and at least one negative guiding substrate 22 electrically connected to the negative electrodes N of the capacitor units 1. Therefore, the sixth embodiment of the present invention can provide three positive product lead frames (such as three positive guiding substrates 21) and at least one negative product lead frame (such as at least one negative guiding substrate 22).

Figure 7:
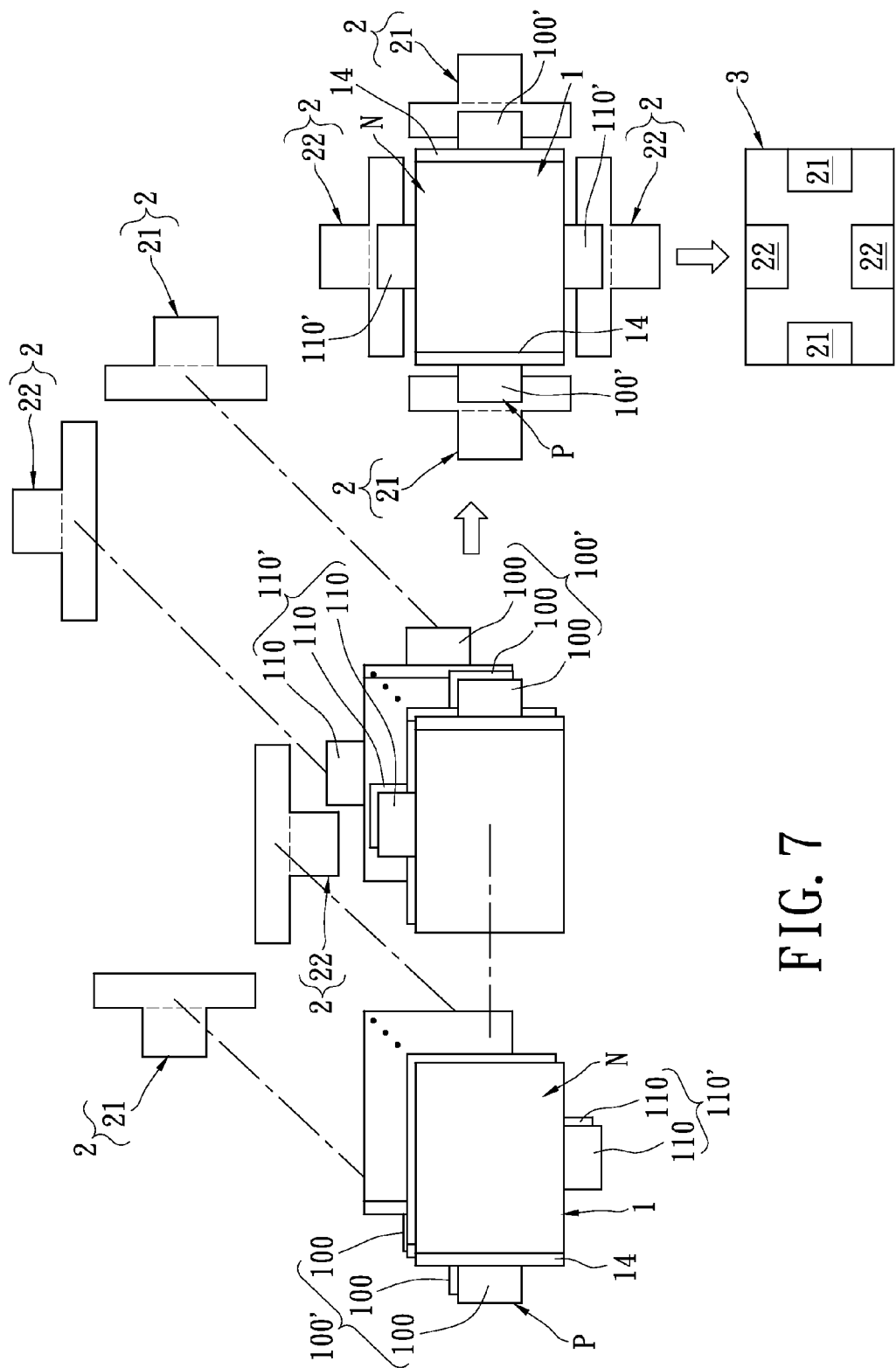
FIG. 7 is a schematic view of the method of stacking the positive electrodes and the negative electrode according to the seventh embodiment of the present invention.

FIG. 7 shows three steps, the first step shows a perspective exploded view of the semi-finished product, the second step shows a top assembled diagram of the semi-finished product, and the third step shows a bottom view of the finished product.

The seventh embodiment of the present invention provides a stacked solid-state electrolytic capacitor with multi-directional product lead frame structure, including: a plurality of capacitor units 1, a substrate unit 2 and a package unit 3. The capacitor units 1 are stacked onto each other. The positive electrode P of each capacitor unit 1 has a positive pin 100 extended outwards, the positive pins 100 are divided into a plurality of positive pin units 100', the positive pins 100 of each positive pin unit 100' are electrically stacked onto each other, and the negative electrodes N of the capacitor units 1 are electrically stacked onto each other. In addition, the substrate unit 2 has a plurality of positive guiding substrates 21 respectively electrically connected to the positive pin units 100' of the capacitor units 1 and a plurality of negative guiding substrates 22 electrically connected to the negative electrodes N of the capacitor units 1. In addition, the positive guiding substrates 21 and the negative guiding substrates 22 can be bent along the dotted lines as shown in FIG. 7, and thereby the end of each positive guiding substrate 21 and the end of each negative guiding substrate 22 can be disposed on a bottom portion of the package unit 3 by bending (as shown in the third step of FIG. 7).

Hence, the difference between the seventh embodiment and the third embodiment is that: in the seventh embodiment, the negative electrode N of each capacitor unit 1 has a negative pin 110 extended outwards, the negative pins 110 are divided into a plurality of negative pin units 110', the negative pins 110 of each negative pin unit 110' are electrically stacked onto each other, and the negative pin units 110' are separated from each other and respectively electrically connected to the negative guiding substrates 22. In addition, the negative guiding substrates 22 can be combined together to form a one-piece conductive substrate as shown in the third, the fourth and the fifth embodiments or can be separated from each other by a predetermined distance as shown in the seventh embodiment. Therefore, the seventh embodiment of the present invention can provide two positive product lead frames (such as two positive guiding substrates 21) and two negative product lead frames (such as two negative guiding substrates 22).

Figure 8:
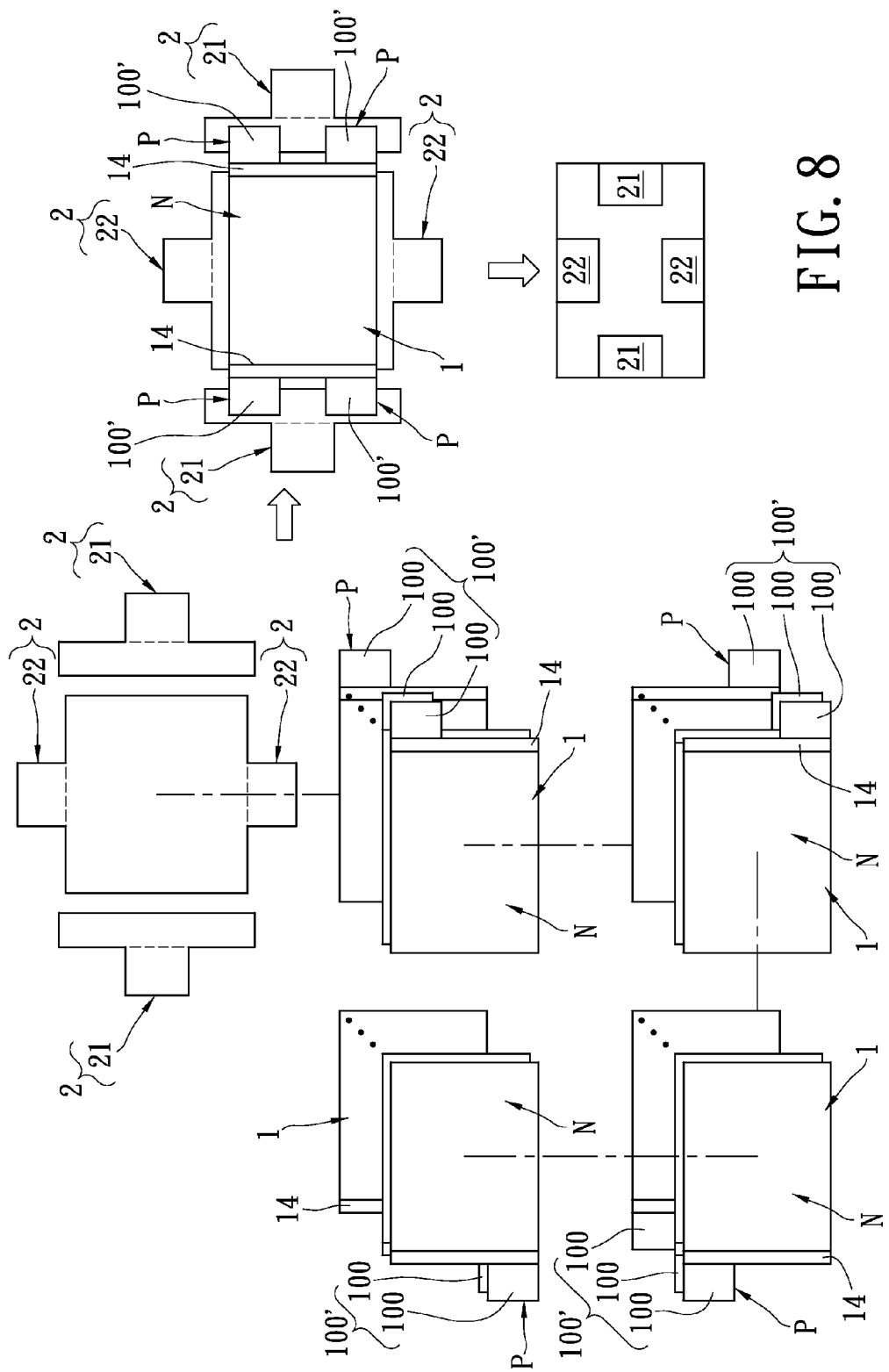
FIG. 8 is a schematic view of the method of stacking the positive electrodes and the negative electrode according to the eighth embodiment of the present invention.

FIG. 8 shows three steps, the first step shows a perspective exploded view of the semi-finished product, the second step shows a top assembled diagram of the semi-finished product, and the third step shows a bottom view of the finished product.

The eighth embodiment of the present invention provides a stacked solid-state electrolytic capacitor with multi-directional product lead frame structure, including: a plurality of capacitor units 1, a substrate unit 2 and a package unit 3. The capacitor units 1 are stacked onto each other. The positive electrode P of each capacitor unit 1 has a positive pin 100 extended outwards, the positive pins 100 are divided into a plurality of positive pin units 100', the positive pins 100 of each positive pin unit 100' are electrically stacked onto each other, and the negative electrodes N of the capacitor units 1 are electrically stacked onto each other. In addition, the substrate unit 2 has a plurality of positive guiding substrates 21 respectively electrically connected to the positive pin units 100' of the capacitor units 1 and a plurality of negative guiding substrates 22 electrically connected to the negative electrodes N of the capacitor units 1. The negative guiding substrates 22 can be combined together to form a one-piece conductive substrate or can be separated from each other by a predetermined distance. In addition, the positive guiding substrates 21 and the negative guiding substrates 22 can be bent along the dotted lines as shown in FIG. 8, and thereby the end of each positive guiding substrate 21 and the end of each negative guiding substrate 22 can be disposed on a bottom portion of the package unit 3 by bending (as shown in the third step of FIG. 8).

Hence, the difference between the eighth embodiment and the third embodiment is that: in the eighth embodiment, one part of the positive pin units 100' that has been electrically connected to one positive guiding substrate 21 are extended along the same direction, other part of the positive pin units 100' that has been electrically connected to another positive guiding substrate 21 are extended along the same direction, and the positive pin units 100' are separated from each other in order to decrease the soldering height of the positive pins 100 of each positive pin unit 100'.

In conclusion, the present invention uses one or more positive pins (the positive pins are respectively extended outwards from the positive electrodes along the same direction or different directions) and one or more negative pins to respectively electrically connect to one or more positive guiding substrates and one or more negative guiding substrates, and thus the soldering difficulty is decreased and the ESR (Equivalent Series Resistance) and the ESL (Equivalent Series Inductance) are also decreased.

The above-mentioned descriptions merely represent solely the preferred embodiments of the present invention, without any intention or ability to limit the scope of the present invention which is fully described only within the following claims. Various equivalent changes, alterations or modifications based on the claims of present invention are all, consequently, viewed as being embraced by the scope of the present invention.

What is claimed is:

1. A stacked solid electrolytic capacitor, comprising:
   a substrate unit including a positive guiding substrate and a negative guiding substrate, wherein the positive guiding substrate has a positive exposed end integrally extended therefrom along a first predetermined direction, and the negative guiding substrate has a first negative exposed end integrally extended therefrom along a second predetermined direction, a second negative exposed end integrally extended therefrom along a third predetermined direction, and a third negative exposed end integrally extended therefrom along a fourth predetermined direction, wherein the first, the second, the third and the fourth predetermined directions are different;
   a plurality of capacitor units stacked on top of one another and disposed on the negative guiding substrate; and
   a package unit enclosing the capacitor units, one part of the positive guiding substrate and one part of the negative guiding substrate, wherein the positive exposed end and the first, the second and the third negative exposed ends are exposed from the package unit, and the positive exposed end and the first, the second and the third negative exposed ends are bent and disposed on a bottom side of the package unit;
   wherein each capacitor unit includes a positive electrode electrically connected to the positive guiding substrate and a negative electrode electrically connected to the negative guiding substrate, the positive electrode of each capacitor unit has a positive pin extended therefrom along the first predetermined direction to electrically connect to the positive guiding substrate, and the positive pins of the positive electrodes of the capacitor units are stacked on top of one another and disposed on the positive guiding substrate.

2. The stacked solid electrolytic capacitor as claimed in claim 1, wherein the first, the second and the third negative exposed ends are respectively extended from three different lateral sides of the negative guiding substrate.

3. The stacked solid electrolytic capacitor as claimed in claim 1, wherein the first predetermined direction is opposite to the third predetermined direction, and the second predetermined direction is opposite to the fourth predetermined direction.

4. The stacked solid electrolytic capacitor as claimed in claim 1, wherein each capacitor unit has a valve metal foil, an oxide insulation layer enclosing the valve metal foil, a conductive polymer layer covering one part of the oxide insulation layer, and a carbon glue layer covering the conductive polymer layer.

5. The stacked solid electrolytic capacitor as claimed in claim 4, wherein each capacitor unit has a resin body covering an external edge of each corresponding oxide insulation layer, each capacitor unit has an insulating layer disposed around an external surface of each corresponding oxide insulation layer to limit the lengths of the conductive polymer layer and the carbon glue layer.

6. A stacked solid electrolytic capacitor, comprising:
   a substrate unit including a positive guiding substrate, a first negative guiding substrate, a second negative guiding substrate and a third negative guiding substrate, wherein the positive guiding substrate has a positive exposed end integrally extended therefrom along a first predetermined direction, the first negative guiding substrate has a first negative exposed end integrally extended therefrom along a second predetermined direction, the second negative guiding substrate has a second negative exposed end integrally extended therefrom along a third predetermined direction, and the third negative guiding substrate has a third negative exposed end integrally extended therefrom along a fourth predetermined direction, wherein the first, the second, the third and the fourth predetermined directions are different;
   a plurality of first capacitor units, a plurality of second capacitor units and a plurality of third capacitor units stacked on top of one another; and
   a package unit enclosing the first, the second and the third capacitor units, one part of the positive guiding substrate, one part of the first negative guiding substrate, one part of the second negative guiding substrate and one part of the third negative guiding substrate, wherein the positive exposed end and the first, the second and the third negative exposed ends are exposed from the package unit, and the positive exposed end and the first, the second and the third negative exposed ends are bent and disposed on a bottom side of the package unit;
   wherein each first capacitor unit includes a first positive electrode electrically connected to the positive guiding substrate and a first negative electrode electrically connected to the first negative guiding substrate, the first positive electrode of each first capacitor unit has a first positive pin extended therefrom along the first predetermined direction to electrically connect to the positive guiding substrate, the first negative electrode of each first capacitor unit has a first negative pin extended therefrom along the second predetermined direction to electrically connect to the first negative guiding substrate, the first positive pins of the first positive electrodes of the first capacitor units are stacked on top of one another and disposed on the positive guiding substrate, and the first negative pins of the first negative electrodes of the first capacitor units are stacked on top of one another and disposed on the first negative guiding substrate;
   wherein each second capacitor unit includes a second positive electrode electrically connected to the positive guiding substrate and a second negative electrode electrically connected to the second negative guiding substrate, the second positive electrode of each second capacitor unit has a second positive pin extended therefrom along the first predetermined direction to electrically connect to the positive guiding substrate, the second negative electrode of each second capacitor unit has a second negative pin extended therefrom along the third predetermined direction to electrically connect to the second negative guiding substrate, the second positive pins of the second positive electrodes of the second capacitor units are stacked on top of one another and disposed on the positive guiding substrate, and the second negative pins of the second negative electrodes of the second capacitor units are stacked on top of one another and disposed on the second negative guiding substrate;
   wherein each third capacitor unit includes a third positive electrode electrically connected to the positive guiding substrate and a third negative electrode electrically connected to the third negative guiding substrate, the third positive electrode of each third capacitor unit has a third positive pin extended therefrom along the first predetermined direction to electrically connect to the positive guiding substrate, the third negative electrode of each third capacitor unit has a third negative pin extended therefrom along the fourth predetermined direction to electrically connect to the third negative guiding substrate, the third positive pins of the third positive electrodes of the third capacitor units are stacked on top of one another and disposed on the positive guiding substrate, and the third negative pins of the third negative electrodes of the third capacitor units are stacked on top of one another and disposed on the third negative guiding substrate.

7. The stacked solid electrolytic capacitor as claimed in claim 6, wherein the first predetermined direction is opposite to the third predetermined direction, and the second predetermined direction is opposite to the fourth predetermined direction.

8. The stacked solid electrolytic capacitor as claimed in claim 6, wherein each capacitor unit has a valve metal foil, an oxide insulation layer enclosing the valve metal foil, a conductive polymer layer covering one part of the oxide insulation layer, and a carbon glue layer covering the conductive polymer layer.

9. The stacked solid electrolytic capacitor as claimed in claim 8, wherein each capacitor unit has a resin body covering an external edge of each corresponding oxide insulation layer, each capacitor unit has an insulating layer disposed around an external surface of each corresponding oxide insulation layer to limit the lengths of the conductive polymer layer and the carbon glue layer.

10. A stacked solid electrolytic capacitor, comprising:
a substrate unit including a first positive guiding substrate, a second positive guiding substrate, a third positive guiding substrate and a negative guiding substrate, wherein the first positive guiding substrate has a first positive exposed end integrally extended therefrom along a first predetermined direction, the second positive guiding substrate has a second positive exposed end integrally extended therefrom along a second predetermined direction, the third positive guiding substrate has a third positive exposed end integrally extended therefrom along a third predetermined direction, and the negative guiding substrate has a negative exposed end integrally extended therefrom along a fourth predetermined direction, wherein the first, the second, the third and the fourth predetermined directions are different;
a plurality of first capacitor units, a plurality of second capacitor units and a plurality of third capacitor units stacked on top of one another and disposed on the negative guiding substrate; and
a package unit enclosing the first, the second and the third capacitor units, one part of the first positive guiding substrate, one part of the second positive guiding substrate, one part of the third positive guiding substrate and one part of the negative guiding substrate, wherein the first, the second and the third positive exposed ends and the negative exposed end are exposed from the package unit, and the first, the second and the third positive exposed ends and the negative exposed end are bent and disposed on a bottom side of the package unit;
wherein each first capacitor unit includes a first positive electrode electrically connected to the first positive guiding substrate and a first negative electrode electrically connected to the negative guiding substrate, the first positive electrode of each first capacitor unit has a first positive pin extended therefrom along the first predetermined direction to electrically connect to the first positive guiding substrate, and the first positive pins of the first positive electrodes of the first capacitor units are stacked on top of one another and disposed on the first positive guiding substrate;
wherein each second capacitor unit includes a second positive electrode electrically connected to the second positive guiding substrate and a second negative electrode electrically connected to the negative guiding substrate, the second positive electrode of each second capacitor unit has a second positive pin extended therefrom along the second predetermined direction to electrically connect to the second positive guiding substrate, and the second positive pins of the second positive electrodes of the second capacitor units are stacked on top of one another and disposed on the second positive guiding substrate;
wherein each third capacitor unit includes a third positive electrode electrically connected to the third positive guiding substrate and a third negative electrode electrically connected to the negative guiding substrate, the third positive electrode of each third capacitor unit has a third positive pin extended therefrom along the third predetermined direction to electrically connect to the third positive guiding substrate, and the third positive pins of the third positive electrodes of the third capacitor units are stacked on top of one another and disposed on the third positive guiding substrate.

11. The stacked solid electrolytic capacitor as claimed in claim 10, wherein the first predetermined direction is opposite to the third predetermined direction, and the second predetermined direction is opposite to the fourth predetermined direction.

12. The stacked solid electrolytic capacitor as claimed in claim 10, wherein the first positive guiding substrate, the second positive guiding substrate and the third positive guiding substrate are respectively disposed beside three different lateral sides of the negative guiding substrate.

13. The stacked solid electrolytic capacitor as claimed in claim 10, wherein each capacitor unit has a valve metal foil, an oxide insulation layer enclosing the valve metal foil, a conductive polymer layer covering one part of the oxide insulation layer, and a carbon glue layer covering the conductive polymer layer.

14. The stacked solid electrolytic capacitor as claimed in claim 13, wherein each capacitor unit has a resin body covering an external edge of each corresponding oxide insulation layer, each capacitor unit has an insulating layer disposed around an external surface of each corresponding oxide insulation layer to limit the lengths of the conductive polymer layer and the carbon glue layer.

* * * * *